Dec. 7, 1943.  B. F. FOWLER  2,336,004
METHOD OF AND APPARATUS FOR COLLECTING DUST
Filed July 29, 1940   3 Sheets-Sheet 1
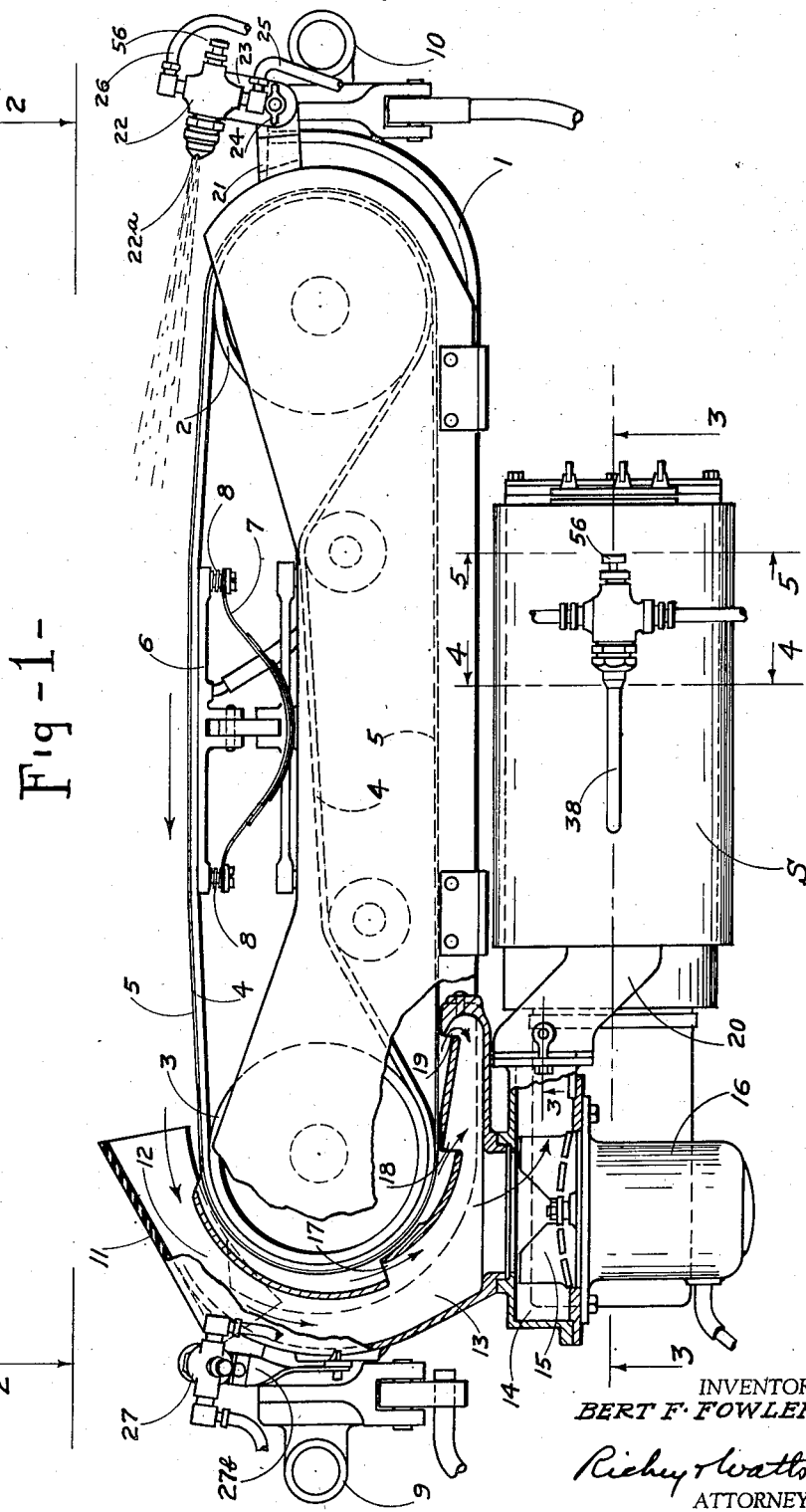
INVENTOR.
BERT F. FOWLER
Richey & Watts
ATTORNEYS

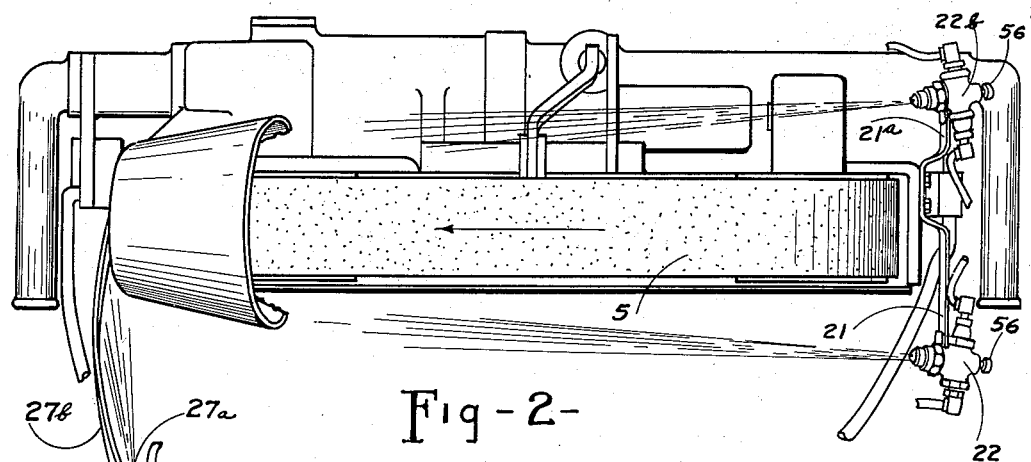
Fig-2-
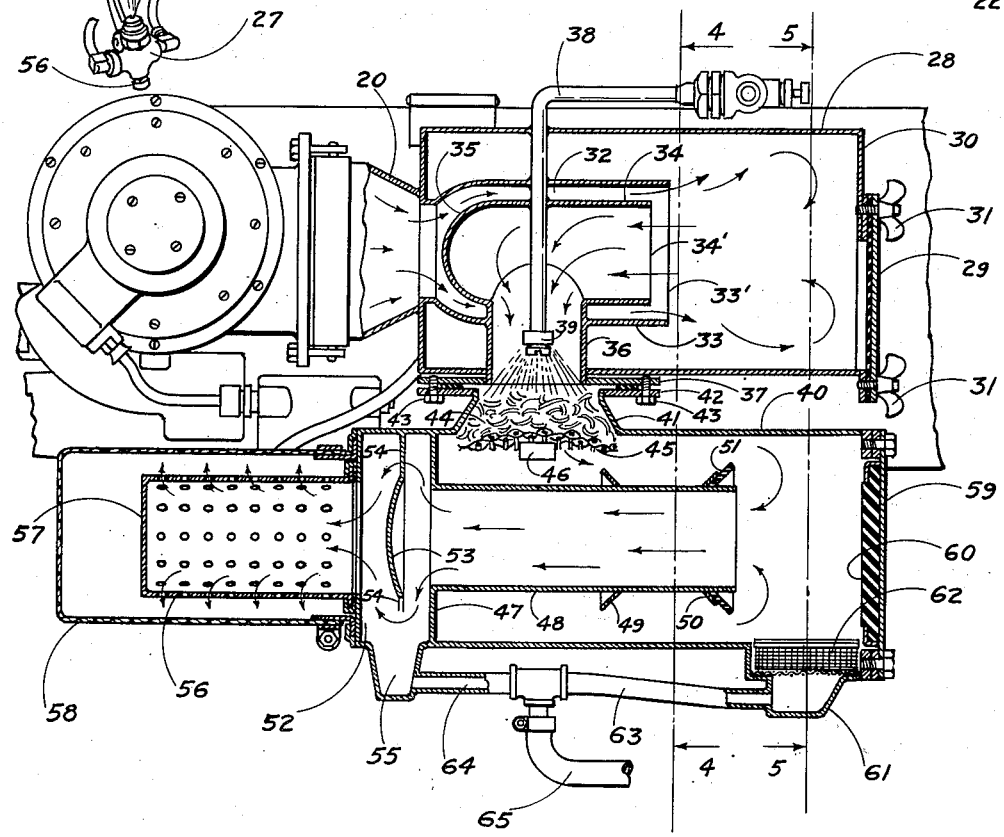
Fig-3

Dec. 7, 1943.  B. F. FOWLER  2,336,004
METHOD OF AND APPARATUS FOR COLLECTING DUST
Filed July 29, 1940  3 Sheets-Sheet 3
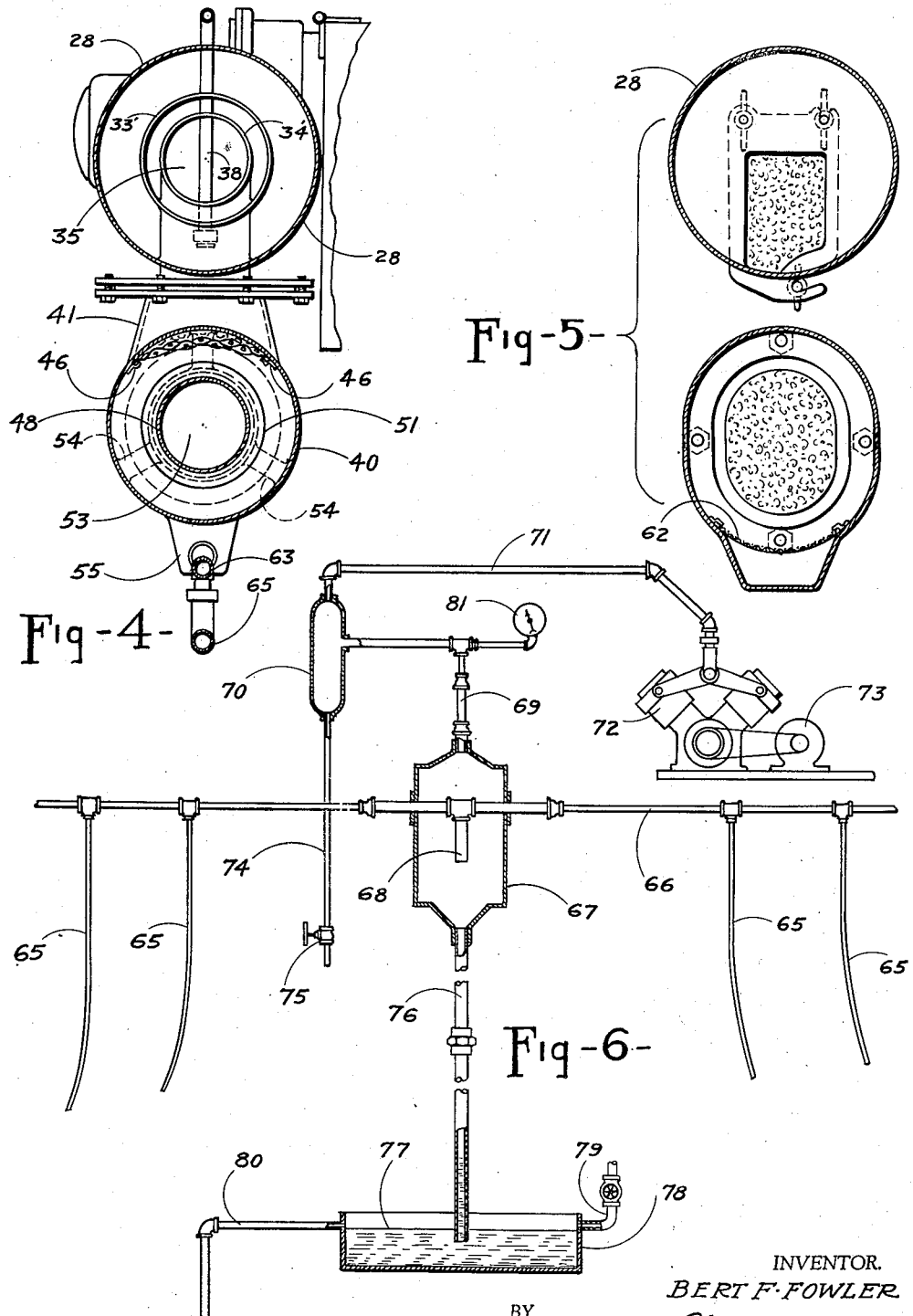
INVENTOR.
BERT F. FOWLER
BY
Richey & Watts
ATTORNEYS Patented Dec. 7, 1943

2,336,004

UNITED STATES PATENT OFFICE 2,336,004

METHOD OF AND APPARATUS FOR COLLECTING DUST

Bert F. Fowler, South Bend, Ind.

Application July 29, 1940, Serial No. 348,131

14 Claims. (Cl. 51—170)

This invention relates to dust elimination and more particularly to improved methods of and apparatus for collecting and disposing of dust formed during certain industrial operations and thereby maintaining the atmospheric dust content at a low value.

Fine particles of material are thrown off into the atmosphere in numerous manufacturing procedures. It has been recognized that certain dusts, such as lead dust and silica dust, are harmful to the workers who must breathe an atmosphere containing such dust and considerable work has been done to eliminate these dangers and to establish standards of atmospheric dust content which are safe and permissible.

The present invention relates particularly to a method of and means for collecting and preventing the distribution of dust which is formed during surface finishing operations such as dry sanding, etc., and the apparatus illustrated and described is particularly adapted for finishing metal surfaces, such as automobile bodies, preparatory to painting. In the manufacture of vehicle bodies, and other similar sheet metal structures, lead solder is frequently used to cover imperfections and to fill in depressions, etc. After this lead solder is deposited it is necessary to smooth it to a proper surface finish for the final painting. In my U. S. Patent No. 2,199,069 of April 30, 1940, and my co-pending U. S. patent applications Serial No. 248,279, filed December 29, 1938, and Serial No. 190,254, filed February 12, 1938, now Patents 2,261,244 of November 4, 1941, and 2,279,782 of April 14, 1942, respectively, I have described and claimed certain improvements in sanding machines particularly adapted for such operations and a generally similar type of sanding machine is illustrated herein equipped with my improved dust laying and collecting means. Where machines of this kind are used to take cuts on solder a certain amount of lead dust is distributed into the air where it may be breathed by the operators. I have found that, by creating a mist or fog of very finely divided atomized water and air, which mist or fog is discharged adjacent to and around the point of creation of the dust, I am able to cause moisture to be precipitated upon the dust particles whereby they may be, in a large measure, collected by suitable means and those particles which are not caught in the collecting means will have sufficient mass to fall promptly to the floor rather than float around in the atmosphere.

I have employed my improved dust collecting system in a large modern automobile body factory and have been able to keep the lead dust content down to or below a value of approximately 1.5 milligrams of lead per 10 cubic meters of air. Certain state health authorities have held that such a concentration of lead in the atmosphere is harmless and my improved system has resulted in entirely satisfactory working conditions, where, prior to its installation, the lead content was at times as much as 3½ milligrams per 10 cubic meters of air.

It is among the objects of my present invention to provide an improved method of handling and collecting dust created in surface finishing operations such as the sanding of lead solder or the like; to provide means for increasing the mass of the individual dust particles set up by a grinding or polishing operation substantially at the point where the particles are created; to provide means for directing streams or mist of finely atomized water around the point of creation of dust, withdrawing and collecting the atomized water and moistened dust particles, and discharging the air in which said particles were entrained back to the atmosphere; to provide a surface finishing machine of the type described with means for collecting and preventing the entrainment of dust in the atmosphere in harmful quantities; to provide a dust handling procedure and apparatus which will not interfere with the efficient surface finishing operation of the machine; to provide means for maintaining the dust content in the atmosphere adjacent metal sanding operations or the like at a value which will be entirely safe from a health point of view; and to provide an extremely simple and economical means for preventing the distribution into the air of dust formed during grinding or polishing operations or the like.

The above and other objects of my invention will appear from the following description of certain preferred procedures and certain apparatus adapted to carry out my invention, reference being had to the accompanying drawings, in which—

Figure 1 is an elevational view of a belt sanding machine equipped with my improved atomizing jets and dust collecting and separating units.

Figure 2 is a plan view taken substantially on line 2—2 of Figure 1.

Figure 3 is a detached vertical cross-sectional view taken on line 3—3 of Figure 1.

Figure 4 is a cross-sectional view taken on line 4—4 of Figure 3.

Figure 5 is a cross-sectional view taken on line 5—5 of Figure 3.

Figure 6 is a diagrammatic layout of my improved water and dust removal system.

In Figure 1 I have illustrated a belt sanding machine of the type illustrated in my above noted patent applications. Although this particular form of sanding machine is specifically referred to herein it will be understood that my improved dust collecting method and apparatus can be utilized with other forms of grinding or polishing equipment. In Figure 1, the main frame 1 of the machine carries pulleys 2 and 3, one of which is suitably driven, and the driving belt 4 and sanding belt 5 encompass the pulleys 2 and 3 and are driven thereby. A supporting shoe 6 engages the underside of the belt 4 between the main pulleys 2 and 3, and, due to the springs 7 and 8, provides a resilient backing for the working reach of the sanding belt 5. Handles 9 and 10 are provided at the ends of the frame 1 and are adapted to be grasped by the operator to guide and move the surface of the sanding belt over the work.

The sanding belt 5 travels in the direction indicated by the arrow in Figures 1 and 2 toward a dust collecting hood 11 of flexible material, such as rubberized fabric or the like, which normally projects up and is positioned to intercept and collect dust which is carried along with the belt 5. This hood 11 defines and overlies the opening 12 of the intake manifold 13 which leads to the fan chamber 14 in which is disposed the suction fan 15. A motor 16 is connected to drive the fan 15 in a direction to draw air through the inlet opening 12 and the auxiliary inlets 17, 18 and 19, into the manifold 13. From the fan chamber 14 the air and dust which enter the manifold 13 are discharged into the entrance 20 of the dust and moisture collecting and separating apparatus which is generally indicated at S in Figure 1.

Adjustably supported on a projecting arm or bracket 21 is an atomizing jet or nozzle 22. This is carried directly by an arm 23 which is pivotally held at the end of the arm 21 by suitable screw and thumb nut 24. By adjusting the position of the bracket 21 and the arm 23 the direction of the discharge from the atomizer 22 may be set to give the most effective results.

Air under pressure is led to the atomizer 22 through a pipe 25 and water is supplied through the pipe 26. The atomizer 22 may be of any suitable form which is adapted to divide the water into extremely fine particles and discharge a mist or spray carried by a jet or air. The pipes 25 and 26 are provided with suitable control valves, not shown, for regulating the quantity and pressure of the air and water supplied to the atomizer and I have found that, for preventing the distribution of lead dust into the air with the type of machine illustrated, an air pressure of approximately 30 to 40 pounds per square inch and a water pressure of from 1 to 2 pounds per square inch gives a very effective result while maintaining the quantity of water in the discharged mist at such a low value that the dry sanding action of the belt on the work surface is not impaired.

As is indicated on Figures 1 and 2, the nozzle 22ᵃ of the atomizer 22 is aimed so as to direct the atomized water almost parallel to and around the working area of the sanding belt 5 where it passes over the supporting shoe 6. It should be particularly noted that the nozzle 22 directs the atomized liquid in the same direction as the movement of the working surface of the belt 5 and toward the collecting hood 11. The bracket 21 has an extension 21ᵃ which extends on the opposite side of the sand belt 5 from the atomizer 22 and a similar atomizer 22ᵇ is adjustably supported on the bracket portion 21ᵃ. This atomizer 22ᵇ is positioned to direct a mist of finely divided water in a direction similar to that of the atomizer 22 but on the opposite side of the belt 5. Thus, as is clearly seen in Figure 2, dust which is created by the action of the sanding belt on the work is immediately hemmed in and surrounded by a mist or fog of atomized water which surrounds and picks up the dust particles and carries them toward the inlet hood 11 and effectively prevents their escape into the surrounding atmosphere.

The vacuum fan 15 creates a reduced pressure at the hood 11 and thus some of the mist, together with the solid particles created by the abrasive belt, is sucked into the manifold 13 and discharged into the inlet of the collecting and separating device S. A large percentage of all of the dust formed is drawn into the manifold 13 but, as some may tend to be carried past the hood 11, I provide a second atomizer 27 mounted on an arm 27ᵇ which is secured to the frame 1. As is seen in Figures 1 and 2, this atomizer 27 is adjustably supported on the arm 27ᵇ and is positioned beyond the hood 11 and transversely away from the line of travel of the belt 5. The atomized mist discharged by the nozzle 27ᵃ of atomizer 27 is directed transversely across the direction of travel of the mist from the jets 22 and 22ᵇ and any dust particles which escape and travel past the hood 11 will be picked up by the discharge from the jet 27 and thoroughly wetted, thus increasing their mass and causing them promptly to drop to the floor where, due to their moist condition, they will remain until swept up or otherwise removed. Furthermore, by directing the nozzle 27ᵃ away from the operator such particles as may possibly escape the hood 11 will be kept away from the operator's breathing zone while they are falling to the floor.

By combining the action of the atomizers 22, 22ᵇ and 27 I have been able to reduce the percentage of dust which escapes to the atmosphere to a value well below dust content which is considered safe and proper for healthful working conditions.

Referring now particularly to Figures 3, 4 and 5, the entrained solid particles which are drawn into the manifold 13 and discharged into the inlet 20 pass into the preliminary separating chamber 28 of the collector structure S. This chamber 28 is generally cylindrical in form and is provided with an outlet gate 29 detachably secured to the end wall 30 thereof by thumb nuts 31. Air and dust passing through the inlet conduit 20 enter an annular passage 32 defined by an outer tubular conduit 33 and an inner tubular member 34 having a rounded closed end 35. It will be noted that the end 33' of the tube 33 extends somewhat beyond the end 34' of the tube 34 and an outlet pipe 36 extends through the wall of the pipe 33 and enters the conduit 34. This outlet pipe 36 terminates in a flange 37 and a spray feed pipe 38, for air and water, extends through the walls of the chamber 28, pipe 33 and pipe 34 and has a spray head 39 disposed within the outlet pipe 36 and adapted to discharge water in the form of a fairly coarse spray or rain downwardly and outwardly as indicated in Figure 3.

The air and entrained dust pass through the annular passage 32 at a relatively high velocity and are then discharged into the enlarged open body space within the chamber 28. This reduces the velocity of the air and the reversal of the flow sets up eddy currents which permit a large part of the entrained lead or other solid material to drop out into the bottom portion of the chamber 28. By opening the cover plate or door 29 the collected, substantially dry solid particles can be emptied from the vessel or chamber 28.

The secondary cleaning unit comprises a generally cylindrical vessel or chamber 40 having an upwardly extending inlet conduit 41. The flange 42, connected to the end of the inlet conduit 41, is secured to the flange 37 of the primary cleaning unit by screws 43 and a loose mass of metallic wool 44 is supported in the inlet conduit 41 on a coarse mesh wire screen 45 which may be held in position on clips 46 secured to the wall of the vessel 40.

Adjacent one end of the vessel 40 is a baffle wall 47 from which a tubular member 48 extends axially of the housing 40. The air which passes through the outlet pipe 36 into the inlet conduit 41 may still contain very fine particles of solid material. These are substantially completely removed from the air due to the intimate contact between the air and the large area of wetted surface formed by the metallic wool mass 44 and the wet surfaces within the vessel 40. The spray of water 39 is of sufficient volume to wash continuously this mass of fibrous material 44, thus washing down and causing a substantial volume of water to drop into the interior of the vessel 40. A considerable part of this water falls upon the surface of the tubular member 48 and as the air travel is to the right, in the direction of the arrows shown in Figure 3, the water containing solid material tends to flow to the right on the outer surface of the tube 48. To impede this flow and cause the water and entrained solids to drop off from the tube 48 into the bottom of the vessel 40 I provide a baffle ring member 49, inclined opposite to the air flow, which tends to assist in removing water particles from the air stream within the chamber 40. Adjacent the air inlet end of the pipe 48 I provide another conical baffle 50, inclined in the direction of air flow. This second baffle also includes a flexible rubber portion 51 which is supported and held in place by the metal portion 50. Part of the water which collects on the pipe 48 and is not caused to drop off by the baffle 49 will move along the surface of the pipe 48 until it reaches the baffle 50—51.

I have found that by making at least the peripheral edge of the conical baffle element 51 of soft rubber the tendency of the water to stick to the surface of the pipe structure is greatly reduced and the water drops will fly off of the edge of the rubber ring 51 and drop to the bottom of the vessel 41. The air which has been freed of water in the chamber 40 is caused to reverse its direction and pass into the right hand (Fig. 3) or inlet end of the pipe 48 and out through the outlet end into the manifold chamber 52. A baffle 53 is supported on spaced arms 54 in the manifold 52 adjacent the exit end of the pipe 48. Any particles of water which may still remain in the air will impinge against the baffle 53 and drop off the bottom thereof into the sump 55. The air then passes into a perforated discharge drum 56 having a solid end 57 and preferably surrounded by a pervious fabric bag 58.

The purpose of the drum 56 and the bag 58 is largely to diffuse the discharged air and prevent it from being directed with any degree of force in any one direction, thus improving the comfort of the operator handling the machine by avoiding the possibility of a strong discharge of air against his body.

The air which enters the vessel 40 through the inlet conduit 41 passes toward the end wall 59 and carries with it a considerable part of the water particles with their entrained solids. I have found that by providing a relatively soft rubber pad 60 on the surface of the end wall 59 I am able much more effectively to remove water from the moving air stream. Where a bare metallic wall is used as the end of the chamber 40 the water particles strike with sufficient force to splatter and splash off the wall where they are again picked up by the air stream and caused to move through the pipe 48. However, by providing the resilient cushion 60 on the end wall 59 the water particles which strike the end wall do not bounce off but merely run down into the sump 61. Of course, water which collects upon the pipe 48 and drips off into the chamber 40 also collects in the sump 61 and a removable screen 62 is preferably provided to collect and strain out any lint or the like which may be torn off from the fabric backing of the sanding belts. A pipe 63 leads from the sump 61 and a pipe 64 leads from the sump 55. These pipes are both connected to the suction discharge conduit 65, preferably a flexible rubber hose which will not interfere with the operator's manipulation of the sander.

In Figure 6 I have illustrated, in a diagrammatic way, my improved suction system for removing water and dust from the secondary cleaning units 40 of a battery of sanding machines. A plurality of suction hoses 65 are shown connected to a suction header 66 and it will be understood that the header 66 may extend the entire length of a production line and be provided with enough hoses 65 so that all of the sanders on the line can be connected to the single wet suction removal system. The header 66 extends into the separating tank 67 and has a downwardly extending discharge portion 68 which opens into the interior of the chamber 67. The air outlet pipe 69 extends from the top of the chamber 67 to a water collecting vessel 70 and a pipe 71 extends from the vessel 70 to the suction pump 72. This pump may be of any suitable type, and, as illustrated, is adapted to be driven by a motor 73. A drain pipe 74 leads from the bottom of the water chamber 70 and is provided with a shut off valve 75 which is normally maintained closed except when it is desired to remove any collected water from the vessel 70.

Extending from the bottom of the separator 67 is a standpipe 76 which has its open bottom end disposed below the water level 77 in an open pan 78. The length of the standpipe 76 is preferably made greater than the maximum length of a column of water which can be supported by atmospheric pressure, i. e. greater than about 34 feet. Thus, even though all of the tubes 65 are shut off and the vacuum pump 72 could create an almost perfect vacuum within the vessel 67, water could not be raised in the pipe 76 sufficiently high to be drawn up through the pipe 69, vessel 70 and pipe 71 into the vacuum pump with resulting damage to the pump. The water level 77 may be maintained through a water inlet supply 79 and an overflow pipe 80 and a pressure gauge 81 indicates the effective pressure in the separator tank 67.

In the operation of my improved wet vacuum collector and separator a suction is applied at all times to each pipe 65 on the operating sander units. This suction withdraws a mixture of water and air, together with fine solids entrained in the water, from the sumps 55 and 61 of each machine and draws the mixture up into the header 66 from which it is discharged into the separating tank 67 through the outlet nozzle 68. In this tank 67 the water, of course, drops into the pipe 76 and the air is withdrawn through the pipe 69 to the water bulb 70 and from thence through the pipe 71 to the vacuum pump 72. The water collector 70 is provided merely as a safety factor to remove any particles of water which may possibly be entrained in the air which passes through the pipe 69. At intervals, preferably when the sanding machines are not operating, the valve 75 may be opened to permit any collected water to drain out of the vessel 70.

The water which passes into the pipe 76 carries with it the finely divided solid material and this water and solid material pass down through the pipe into the pan 78. The pan is of sufficiently large area to permit the fine solid particles to drop out and collect on the bottom of the pan so that the overflow through the pipe 80 is substantially clear water. In solder sanding operations the material collected in the pan 78 is a lead flour of extremely fine consistency but which may readily be reclaimed and melted down for re-use in the soldering operations.

With my improved primary and secondary cleaning apparatus I am able to remove substantially all solid material which may be contained in the air entering the separator through the inlet 20. The relatively large and heavy particles are removed in a substantially dry state in the primary separator chamber 28 and may be collected by merely dumping the dust at intervals. In the secondary cleaning chamber 40, and in the connecting passage between the chambers 28 and 40, an extremely effective washing of the air is supplied through the spray nozzle 39 to effect proper removal of the fine flour-like particles which may remain in the air after it reaches the primary chamber 28.

My improved baffles 49 and 51 and my resilient end wall 60 facilitate the collection of entrained water particles upon the walls of the vessel 40 from which the liquid drains into the sump 61 and my baffle 53 collects any water droplets which may still be contained in the air stream. By continuously removing the water which collects in the sumps 55 and 61 the very fine solder does not have an opportunity to settle out and form a solid cement-like mass and my apparatus may be operated continuously for long periods of time without stopping for removal of the collected material.

With my improved suction system, as shown in Figure 6, the fine dust from an entire production line may be collected by a single system and regardless of whether or not all of the sanders which may be connected to pipe 65 are operating, by proper regulation of the vacuum pump 72 and observation of the gauge 81, sufficient vacuum can be maintained on the operating machines properly to remove water and air therefrom. As the standpipe 76 is of sufficient length positively to prevent the entry of water into the vacuum pump 72 all danger of damage due to such an occurrence is eliminated.

It will be understood that each of the atomizers 22, 22b and 27, and the spray nozzle 39, is provided with suitable supply pipes for air and water under proper pressure. Each is also provided with suitable valve means 56 for adjusting the supply delivered thereby.

By my improved water mist jets for preventing the flying of solid particles into the air around their point of origin combined with the suction fan 15, I have provided a dust removal system for sanding machines or the like which definitely eliminates the health hazard connected with the operation of this type of equipment. In some instances a substantial reduction in the amount of dust discharged into the air may be obtained merely by causing a fine mist of water to be discharged into the zone where the dust is created.

It will be understood that, although I have described my invention as used in connection with two types of sanding devices, atomized water in the form of a very finely divided mist or spray may be discharged at the point of generation of dust set up by other manufacturing operations with a resulting material decrease in the floating dust content in the air. By directing the jets of vapor in such a manner that they tend to blow the dust away from the operator, an additional protection is obtained and the air in the vicinity of the operator is kept free from harmful material.

As explained above, my invention has been very successfully applied to the production line of a large automobile body manufacturing establishment with substantial decrease in dust content and material increase in the operators' comfort.

Although I have described certain procedures for maintaining the dust content at a low value and certain specific devices adapted to carry out my improved process, it will be understood by those skilled in the art that variations and modifications may be made in the procedures described herein, and in the apparatus employed, without departing from the spirit of my invention. I do not, therefore, wish to be limited to the exact forms herein shown and described, but claim as my invention all embodiments thereof coming within the scope of the appended claims.

I claim:

1. The method of collecting dust or the like which includes the steps of directing jets or streams of finely atomized water around the place at which the dust is generated, establishing a zone of reduced pressure within the paths of said jets or streams of atomized water, conveying dust and water particles, together with the air in which they are entrained, away from said zone of reduced pressure, separating said dust and water particles from the air and discharging the cleaned air back into the atmosphere.

2. The method of collecting dust created by the operation of a belt sander of the type described which includes directing a mist of atomized water toward the point of engagement of the sanding belt with the work and in the direction of travel of the working portion of said belt, establishing a zone of reduced pressure in alignment with the direction of belt travel at a point spaced from said point of engagement of said belt with the work, conducting air and entrained dust and water particles from said zone of reduced pressure, separating the dust and water particles from said air, and discharging the cleaned air to atmosphere.

3. The method of collecting dust created by the operation of a belt sander of the type described which includes directing a mist of atomized water toward the point of engagement of the sanding belt with the work and in the direction of travel of but to one side of the working portion of said belt, directing a second mist of atomized water toward the point of engagement of the sanding belt with the work and in the direction of travel of but on the opposite side of the working portion of said belt from said first named mist of water, establishing a zone of reduced pressure in alignment with the direction of belt travel and beyond said point of engagement of said belt with the work, conducting air and entrained dust particles from said zone of reduced pressure, separating the dust particles from said air, and discharging the cleaned air to atmosphere.

4. The method of collecting dust created by the operation of a belt sander of the type described which includes directing a mist of atomized water toward the point of engagement of the sanding belt with the work and in the direction of travel of but to one side of the working portion of said belt, directing a second mist of atomized water toward the point of engagement of the sanding belt with the work and in the direction of travel of but on the opposite side of the working portion of said belt from said first named mist of water, directing a third mist of atomized water transversely of the direction of belt travel beyond the point of engagement of the belt and work, establishing a zone of reduced pressure in alignment with the direction of belt travel and beyond said point of engagement of said belt with the work, conducting air and entrained dust particles from said zone of reduced pressure, separating the dust particles from said air, and discharging the cleaned air to atmosphere.

5. In combination with apparatus adapted to create dust, an atomizer, sources of supply of air and water connected to said atomizer, said atomizer having a discharge nozzle positioned to direct a mist of finely atomized water adjacent the place where said apparatus creates dust, a suction fan, a housing for said fan, a manifold connected to said fan housing and having an inlet disposed adjacent said place where said apparatus creates dust, said fan housing having an outlet, and means connected to said outlet for separating and collecting dust and water particles from air discharged from said outlet.

6. In combination with apparatus adapted to create dust, an atomizer, sources of supply of air and water connected to said atomizer, said atomizer having a discharge nozzle positioned to direct a mist of finely atomized water adjacent the place where said apparatus creates dust, a suction fan, a housing for said fan, a manifold connected to said fan housing having a suction inlet disposed adjacent said place where said apparatus creates dust, said fan housing having an outlet, means connected to said outlet for separating and collecting dust and water particles from air discharged from said outlet, means for supplying a water spray to said dust separating means, and suction means for removing dust and water from said separating means.

7. In surface finishing apparatus, a frame, a finishing element having an abrasive surface, means for moving said finishing element relative to said frame whereby a work surface can be subjected to abrasive action of said abrasive surface, an atomizer carried by said frame, means for supplying air and water to said atomizer, means for directing the mist discharged from said atomizer toward and around the place of engagement of said abrasive surface with said work surface, a conduit having an inlet adjacent said place of engagement, means for establishing a reduced pressure in said conduit whereby air, dust and water will be drawn thereinto when surface finishing is being done, and means for separating dust and water from the air drawn into said conduit.

8. In apparatus of the type described, a frame, spaced pulleys carried by said frame, a sanding belt encompassing said pulleys and having a working surface exposed on one reach between said pulleys, means for driving one of said pulleys, an atomizer supported on said frame adjacent one of said pulleys and positioned to direct a mist of finely atomized water in the direction of travel of said working surface, a conduit having an inlet adjacent the other of said pulleys, said inlet being positioned at the path of said mist and of particles thrown off from said belt, means for creating a reduced pressure at said inlet, and means for separating dust and water from air drawn into said inlet.

9. In apparatus of the type described, a frame, spaced pulleys carried by said frame, a sanding belt encompassing said pulleys and having a working surface exposed on one reach between said pulleys, means for driving one of said pulleys, an atomizer supported on said frame adjacent one of said pulleys and positioned to direct a mist of finely atomized water toward said working surface of said belt and in the direction of travel of said working surface, a conduit having an inlet adjacent the other of said pulleys, said inlet being positioned in the path of said mist and of particles thrown off from said belt, means for creating a reduced pressure at said inlet, means for separating dust and water from air drawn into said inlet, and a second atomizer laterally removed from the line of travel of said working surface of said belt and from said inlet opening and positioned to direct a mist of atomized water generally transversely across an extension of said line of travel of said belt.

10. In combination with a sanding machine of the type described having a sanding belt, means for creating a zone of reduced pressure adjacent the point of engagement of the sanding belt with the work, primary dust removing means connected to said means for creating a zone of reduced pressure, secondary dust removing means connected to receive air discharged from said primary dust removing means, means for spraying water into said secondary dust removing means, baffle means for separating water from air in said secondary dust removing means, and means for applying sub-atmospheric pressure to said secondary dust remover to withdraw water and collected dust therefrom.

11. In combination with a sanding machine of the type described having a sanding belt, means for creating a zone of reduced pressure adjacent the point of engagement of the sanding belt with the work, primary dust removing means connected to said means for creating a zone of reduced pressure, secondary dust removing means connected to receive air discharged from said primary dust removing means, means for spraying water into said secondary dust removing means, baffle means for separating water from air in said secondary dust remover, means for applying suction to said secondary dust remover to withdraw water and collected dust therefrom, a separating tank, a conduit leading from said secondary dust remover to said separating tank, vacuum creating means connected to said tank, a standpipe extending from said separating tank downwardly a distance greater than the maximum height of a column of water supported by atmospheric pressure, said standpipe having an open bottom end, and means for maintaining a pool of water at the bottom of said standpipe with the water lever in the pool above the open end of said standpipe.

12. In combination, a sanding machine, means carried by said machine for collecting dust created thereby, a suction pump, a separating tank, connections from said pump to said tank, connections from said tank to said dust collecting means, a discharge conduit for removing dust from said separating tank, and means for water sealing the outlet end of said discharge conduit.

13. In combination, a suction creating means, a separating tank, connections from said suction means to said tank, a suction header extending from said separating tank, a plurality of flexible conduits connected at spaced points to said header, a plurality of sanding machines, and dust collecting means carried by each of said machines, each of said dust collecting means being connected to said header by one of said flexible conduits.

14. In combination, a suction creating means, a separating tank, connections from said suction means to said tank, a suction header extending from said separating tank, a plurality of flexible conduits connected at spaced points to said header, a plurality of sanding machines, dust collecting means carried by each of said machines, each of said dust collecting means being connected to said header by one of said flexible conduits, a standpipe extending downwardly from said separating tank, and means for maintaining a liquid seal at the lower end of said standpipe.

BERT F. FOWLER.